United States Patent [19]

Baba

[11] Patent Number: 4,817,289
[45] Date of Patent: Apr. 4, 1989

[54] CORD CUTTER HEAD

[75] Inventor: Toru Baba, Yokosuka, Japan

[73] Assignee: Kioritz Corporation, Tokyo, Japan

[21] Appl. No.: 53,026

[22] Filed: May 20, 1987

[30] Foreign Application Priority Data

May 24, 1986 [JP] Japan .............................. 61-78617[U]

[51] Int. Cl.$^4$ ................................................ A01G 3/06
[52] U.S. Cl. ......................................... 30/276; 30/347
[58] Field of Search ................. 30/263, 264, 276, 347; 56/12.7, 295

[56] References Cited

U.S. PATENT DOCUMENTS 4,124,938  11/1978  Ballas ................................. 56/12.7
4,458,419  7/1984  Prolux .................................. 30/276

Primary Examiner—Douglas D. Watts
Attorney, Agent, or Firm—Browdy & Neimark

[57] ABSTRACT

A cord cutter head for use in, for example, a cord cutter type grass trimmer has a housing having which is provided with a downwardly directed opening, and a spool carrying a flexible cutter cord wound thereon. The spool is formed integrally with the housing such that its lower end portion is projected under the housing through the downward opening. The housing has an aperture formed in the wall thereof and adapted to allow the unwound cutter cord to be extracted outside therethrough. The user can rewind the cutter cord from the exposed portion of the spool by his fingers without difficulty.

5 Claims, 1 Drawing Sheet

CORD CUTTER HEAD

BACKGROUND OF THE INVENTION

1. Field of the Invention:

The present invention relates to a cord cutter head for use in, for example, a grass trimmer.

2. Description of the Prior Art:

In general, a cutter head has a flexible cord made of a plastic such as nylon and adapted to serve as a cutter blade. The cord cutter head also has a housing fixed to one end of a drive shaft, and a spool accommodated by the housing and carrying the cutter cord wound thereon. In operation, the free end of the cutter cord is extracted by a desired length out of the housing. The drive shaft is drivingly connected to a suitable power source such as a small-sized internal combustion engine, through a suitable transmission.

When the cutter cord outside the housing has been worn out or cut accidentally, it is necessary to extract a new portion of the cutter cord from the housing. Hitherto, the additional extraction of the new portion of the cutter head was conducted semi-automatically by means of, for example, a device generally referred to as an "inertia shifter".

Such a conventional cord cutter head, however, suffers from a disadvantage in that troubles such as cutting or welding of the cord, as well as rewinding or retraction of the cutter cord into the housing, tend to occur during operation and also in that the construction is complicated and the size is increased with a result that the weight and the cost are increased undesirably. In addition, handling and operations, as well as repair and maintenance, are generally difficult to conduct.

SUMMARY OF THE INVENTION

Accordingly, an object of the present invention is to provide a cord cutter head which is simplified in construction and which is easy to handle and operate, thereby overcoming the above-described problems of the prior art.

To this end, according to the present invention, there is provided a cord cutter head comprising, a housing having a downwardly directed opening; a spool formed integrally with the housing so as to project downward from the housing through the opening and carrying a flexible cutter cord wound thereon; and an aperture formed in the wall of the housing and adapted to allow the portion of the cutter cord unwound from the spool to pass therethrough.

With this arrangement, since the spool on which the cutter cord is wound is exposed outside the housing, the user can easily unwind the cord from the spool or attach the cord to the spool by his fingers.

In addition, the number of the parts employed is decreased to simplify the construction and to facilitate handling and operation, as well as repair and maintenance. For the same reasons, the cost of the cord cutter head is reduced advantageously. The cutter cord can effectively be protected by suitable selection of the position and the shape of the spool. It is also possible to modify the design by, for example, constructing the spool, housing and large-diameter lower end portion of the spool separately or selectively integrally so as to increase the wear resistance according to the uses, or by changing the configurations of these parts, thus accomplishing further improvement.

DESCRIPTION OF THE PREFERRED EMBODIMENT

An embodiment of the present invention will be described hereinunder with reference to the accompanying drawings.

Figure 1:
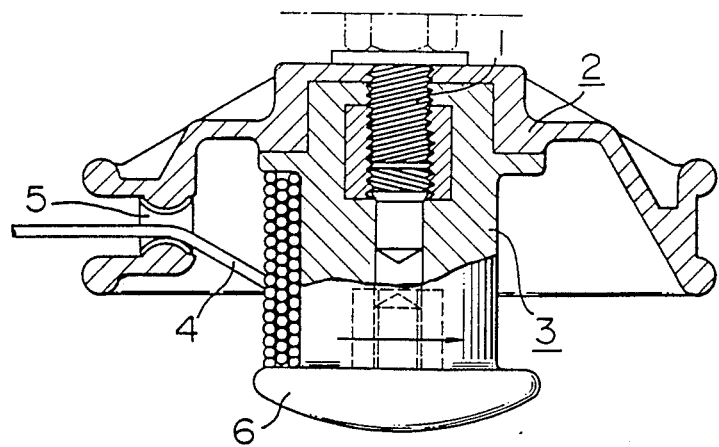
FIG. 1 is a sectional side elevational view of an essential portion of an embodiment of the cord cutter in accordance with the present invention.

As shown in FIG. 1, a cord cutter head embodying the present invention has a drive shaft 1 to which are integrally fixed a downwardly opening housing 2 and a spool 3, using the spool 3 as a fixing nut. The drive shaft 1 is connected to a small-sized internal combustion engine through a suitable transmission means (not shown) which may be a flexible shaft. The drive shaft 1, when driven by the engine, drives the housing 2 and the spool 3 rotatingly as indicated by an arrow.

Figure 2:
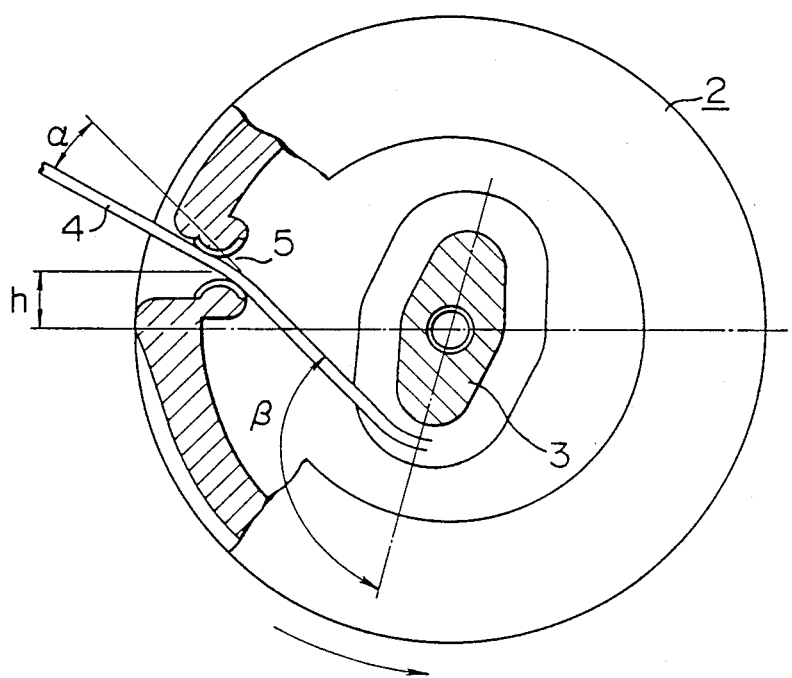
FIG. 2 is a cross-sectional view of an essential portion of the embodiment shown in FIG. 1.

The spool 3 has a boss portion of a cross-section having a longer axis and a shorter axis as will be seen from FIG. 2. A flexible cutter cord 4 made of a plastic material such as nylon is wound on the boss portion of the spool 3. The free end of the flexible cutter cord 4 is extracted by a desired length to the outside of the housing 2 through an aperture 5 which is formed in a portion of the wall of the housing 2 adjacent to an extension of the shorter axis of cross-section of the spool 3.

The lower end portion of the spool 3, which is about ⅓ in terms of the axial height of the spool 3, is projected downwardly from the housing 2 so as to be exposed to the outside. A large-diameter member 6 is detachably secured to the lower end of the spool 3 so as to be renewed when it is worn down.

During the moving operation, the housing 2, spool 3 and the cutter cord 4 are driven at a high speed as a unit with the drive shaft 1, so that a centrifugal force acts on the free end portion of the cutter cord 4 extracted from the housing 2. In consequence, the free end portion of the cutter cord 4 is straightened so as to act as a bar which strikes and cuts the grass.

In this embodiment, the cutter cord 4 which has passed through the aperture 5 is bent around the aperture 5 to the leading side as viewed in the direction of rotation, such that the portion of the cutter cord 4 emerging from the housing 2 makes an angle α to the extension of the portion of the cutter cord 4 between the aperture 5 and the spool 3, so that the centrifugal force acting on the cutter cord 4 is resisted and borne by the rigidity of the cutter cord 4. Thus, the resisting force produced by the rigidity of the cutter cord 4 prevents the centrifugal force from directly acting on the spool 3. In consequence, problems such as welding or embedding of the cutter cord 4, which may otherwise be caused by the centrifugal force, are eliminated.

To this end, the axis of the aperture 5 is offset by an amount h from the center of the spool 3 to the trailing side as viewed in the direction of rotation of the cord cutter head.

Although the spool 3 shown in FIG. 2 has an elliptic cross-section, this cross-sectional shape is not exclusive and other cross-sectional shapes such as oval shape, cocoon-like shape and so forth, as well as a hollow cross-section, may be employed equally. Anyway, in the preferred form of the present invention, the spool 3 has a non-circular cross-section, for the purpose of increasing the effective spool diameter in the region where the cutter cord 4 leaves the spool 3 so as to protect the cord, while minimizing the length of the cutter cord unwound per each unwinding operation. In addition, the non-circular cross-section of the spool 3 provides a greater distance between the aperture 5 and the portion of the spool 3 at which the cord leaves the spool 3, which in turn facilitates the unwinding of the cutter cord 4 from the spool 3 by the user's fingers.

In the embodiment shown in FIG. 2, an extraction angle β which is not smaller than 90° but not greater than 120° is formed between the longer axis of the spool 3 and the portion of the cutter cord 4 extending between the spool 3 and the aperture 5. The extraction angle, however, may be selected to fall within the range of between 60° and 90° without impairing the effect produced by the invention, provided that a space ample enough to allow the manual work is obtained. It is thus possible to effectively protect the cutter cord 4 by limiting the direction of the longer axis of the cross-section of the spool 3 with respect to the aperture 5 formed in the wall of the housing 2.

Although the invention has been described through its preferred forms, it is to be noted here that the described embodiments are only illustrative and various changes and modifications may be imparted thereto without departing from the scope of the present invention which is limited solely by the appended claims.

What is claimed is:

1. A cord cutter head comprising:
   a housing having a downwardly directed opening;
   a spool formed integrally with said housing and comprising a lower end portion for holding a part of a flexible cutter cord thereon, said lower end portion projecting downwardly from said housing through said opening so as to be exposed outside the cutter head and to expose the part of the flexible cutter cord wound thereon;
   and an apparatus formed in the wall of said housing and adapted to allow the portion of the cutter unwound from the spool to pass therethrough;
   said housing and said spool comprising means for providing access to the cord so that a user can rewind or otherwise handle the cutter cord on said spool at the exposed lower end portion of said spool.

2. A cord cutter head according to claim 1, wherein said spool and said housing are integrally fixed to each other through a drive shaft.

3. A cord cutter head according to claim 1, wherein a member having a larger diameter than that of said spool is detachably secured to a free end of the lower end portion of said spool.

4. A cord cutter head according to claim 1, wherein said lower end portion comprises approximately one-third of the length of said spool.

5. A cord cutter head comprising:
   a housing having a downwardly directed opening;
   a spool formed integrally with said housing and comprising a lower end portion which projects downward from said housing through said opening so as to be exposed outside the cutter head, said spool carrying a flexible cutter cord wound thereon;
   a flange member having a larger diameter than that of said spool is detachably secured to a free end of the lower end portion of said spool for supporting the cord;
   and an aperture formed in the wall of said housing and adapted to allow the portion of the cutter unwound form the spool to pass therethrough;
   whereby a user can rewind or otherwise handle the cutter cord on said spool by the exposed lower end portion.

* * * * *